(12) United States Patent
Hu et al.

(10) Patent No.: US 12,111,667 B2
(45) Date of Patent: Oct. 8, 2024

(54) TRANSPORTER AND METHOD FOR TRANSPORTING OBJECT

(71) Applicant: ABB Schweiz AG, Baden (CH)

(72) Inventors: Funing Hu, Shanghai (CN); Fabrice Legeleux, Shanghai (CN)

(73) Assignee: ABB SCHWEIZ AG, Baden (CH)

( * ) Notice: Subject to any disclaimer, the term of this patent is extended or adjusted under 35 U.S.C. 154(b) by 108 days.

(21) Appl. No.: 17/759,549

(22) PCT Filed: May 6, 2020

(86) PCT No.: PCT/CN2020/088691
§ 371 (c)(1),
(2) Date: Jul. 27, 2022

(87) PCT Pub. No.: WO2021/223085
PCT Pub. Date: Nov. 11, 2021

(65) Prior Publication Data
US 2023/0047081 A1 Feb. 16, 2023

(51) Int. Cl.
*G05D 1/00* (2024.01)
(52) U.S. Cl.
CPC ......... *G05D 1/0293* (2013.01); *G05D 1/0214* (2013.01); *G05D 1/0295* (2013.01)
(58) Field of Classification Search
CPC ....... G05D 1/0295; G05D 1/00; G05D 1/0289
USPC .......................................................... 701/23
See application file for complete search history.

(56) References Cited

U.S. PATENT DOCUMENTS

| 2010/0102596 | A1  | 4/2010  | Chapman |
| 2014/0172223 | A1* | 6/2014  | Murphy ............... G05D 1/0289 701/25 |
| 2015/0286218 | A1  | 10/2015 | Shani |
| 2017/0308084 | A1* | 10/2017 | Spicer ................. G05D 1/0088 |

(Continued)

FOREIGN PATENT DOCUMENTS

| CN | 1185771 A   | 11/2002 |
| CN | 1906050 A   | 1/2007  |
| CN | 101037161 A | 9/2007  |

(Continued)

OTHER PUBLICATIONS

International Search Report and Written Opinion, issued by the ISA/CN National Intellectual Property Administration, regarding corresponding patent application Serial No. PCT/CN2020/088691; dated Jan. 28, 2021; 9 pages.

*Primary Examiner* — Todd Melton
*Assistant Examiner* — Vincent Feng
(74) *Attorney, Agent, or Firm* — Greenberg Traurig, LLP

(57) ABSTRACT

Transporters and methods for transporting an object. The transporter includes a carrier comprising a plurality of coupling members; a support assembly adapted to support the carrier; and a plurality of automatic guided vehicles configured to obtain kinematic information from a leading automatic guided vehicle of the plurality of automatic guided vehicles. Each of the plurality of automatic guided vehicles includes a carrier connecting member coupled to the respective coupling member of the carrier to enable the carrier to move with the plurality of automatic guided vehicles; and a patrol assembly adapted to enable the respective automatic guided vehicle to move along the predetermined path.

14 Claims, 4 Drawing Sheets

(56) References Cited

U.S. PATENT DOCUMENTS

2019/0001857 A1\* 1/2019 Schmidt .................. B60P 1/02
2020/0081455 A1 3/2020 Li et al.

FOREIGN PATENT DOCUMENTS

| | | | | | |
|---|---|---|---|---|---|
| CN | 101379368 | A | | 3/2009 | |
| CN | 101792064 | A | | 8/2010 | |
| CN | 101795923 | A | | 8/2010 | |
| CN | 102356367 | A | | 2/2012 | |
| CN | 103223960 | A | | 7/2013 | |
| CN | 103587869 | A | | 2/2014 | |
| CN | 104044587 | A | | 9/2014 | |
| CN | 105119985 | A | | 12/2015 | |
| CN | 105431342 | A | | 3/2016 | |
| CN | 105722771 | A | | 6/2016 | |
| CN | 106477244 | A | | 3/2017 | |
| CN | 106628765 | A | | 5/2017 | |
| CN | 107305389 | A | | 10/2017 | |
| CN | 108791572 | A | \* | 11/2018 | ............. B62D 63/02 |
| CN | 109690605 | A | | 4/2019 | |
| CN | 110322627 | A | | 10/2019 | |
| CN | 110794793 | A | | 2/2020 | |
| CN | 110884908 | A | | 3/2020 | |
| CN | 110913335 | A | | 3/2020 | |
| DE | 102010023318 | A1 | | 12/2011 | |
| WO | 2010043967 | A1 | | 4/2010 | |
| WO | 2014049590 | A1 | | 4/2014 | |
| WO | 2018148770 | A1 | | 8/2018 | |

\* cited by examiner

TRANSPORTER AND METHOD FOR TRANSPORTING OBJECT

CROSS-REFERENCE TO RELATED APPLICATIONS

This is a national stage application which claims priority to International patent application Serial No.: PCT/CN2020/088691, filed on May 6, 2020; and which is herein incorporated by reference in its entirety.

FIELD

Embodiments of the present disclosure generally relate to a transporter and a method for transporting an object.

BACKGROUND

An automated guided vehicle or automatic guided vehicle (AGV) is a mobile robot that follows along markers or paths on the floor, or uses radio waves, vision cameras, magnets, or lasers for navigation or any other navigation system. They are most often used in industrial applications to transport heavy materials around a large industrial building, such as a factory or warehouse.

AGVs can tow objects behind or on top of them in trailers to which they can autonomously attach. The trailers can be used to move raw materials or finished products. AGVs can also store objects on a bed. The objects can be placed on a set of motorized rollers (conveyor) and then be pushed off by reversing the rollers. AGVs are employed in a variety of industries including automotive, aerospace, pulp, paper, metals, newspaper, and general manufacturing. Transporting materials such as food, linen or medicine in hospitals is also performed by AGVs.

To transport large-sized objects such as car frames, conventional solutions typically employ a towing-type transporter or a large-sized transporter. The towing-type transporter comprises an AGV and a long trailer towed by the AGV. The large-sized transporter uses a large-sized AGV. However, this large-sized transporter can only be used for a limited number of objects. For objects that are not applicable, the transporter must to be replaced with one of another size. In sum, the towing-type transporter or the large-sized transporter often encounters problems such as large vibrations, instability, low safety, and poor adaptability.

SUMMARY

Embodiments of the present disclosure provide a transporter and a method of transporting an object.

In a first aspect, a transporter is provided. The transporter comprises at least one carrier comprising a plurality of coupling members; a support assembly adapted to support the carrier and enable the carrier to transport an object along a predetermined path; and a plurality of automatic guided vehicles connected to each other in a wired or wireless manner and configured to obtain kinematic information from one of the plurality of automatic guided vehicles designated as a leading automatic guided vehicle, and the plurality of automatic guided vehicles each comprising: a carrier connecting member coupled to the respective coupling member to enable the carrier to move with the plurality of automatic guided vehicles; and a patrol assembly adapted to enable the respective automatic guided vehicle to move along the predetermined path.

With the carrier driven by a plurality of automatic guided vehicles which can independently move along the path according to kinematic information provided by the leading automatic guided vehicle which can be any one of the plurality of automatic guided vehicle, the size and shape of the carrier can be arbitrarily adjusted to accommodate a variety of different sized objects or workpieces. In this way, costs for transporting the objects with large size can be significantly reduced while improving the adaptability of the transporter.

In some embodiments, the leading automatic guided vehicle configured to provide the kinematic information based at least on a radian of the predetermined path and a positional relationship between the plurality of coupling members relative to the predetermined path. In this way, the coordination between a plurality of automatic guided vehicles is improved while expanding the range of use.

In some embodiments, any other of the plurality of automatic guided vehicles can be re-designated as the leading automatic guided vehicle during a transportation of the object in case of a failure of the previously designated leading automatic guided vehicle. In this way, the control to the plurality of automatic guided vehicles can be more flexible with further improved reliability of transportation of the object.

In some embodiments, the at least one carrier comprises a plurality of carriers connected in series via connecting members arranged between the plurality of carriers. As a result, the transporter can transport longer objects or more objects at a time.

In some embodiments, the connecting members each comprise a coupling portion adapted to be coupled to the carrier connecting member of the respective automatic guided vehicle. In this way, the number of the automatic guided vehicles used in the transporter can be significantly reduced without deteriorating transport capacity, thereby reducing costs of the transporter.

In some embodiments, the plurality of automatic guided vehicles are arranged in at least two columns along a direction parallel to the predetermined path. This arrangement enables transportation of objects with wide dimensions. That is, with the standard automatic guided vehicles, the shape and size of the carrier are flexible, thereby further improving the adaptability of the transporter.

In some embodiments, the plurality of automatic guided vehicles each comprise a monitoring member configured to provide safety information indicating whether an obstacle is within a predetermined range, and wherein the leading automatic guided vehicle is configured to provide the kinematic information to the plurality of automatic guided vehicles further based on the safety information from the plurality of automatic guided vehicles. As a result, the safety of the transporter can be significantly improved.

In some embodiments, the predetermined range is adjustable. In this way, this arrangement enables the monitoring member to adapt to a variety of different situations to further increase safety.

In some embodiments, the transporter further comprises a scheduling member configured to provide scheduling information on the predetermined path and a destination for the object to the leading automatic guided vehicle. In this way, the transporter is easier to manage.

In some embodiments, the plurality of automatic guided vehicles comprise at least two distance detection members each configured to provide distance information on a distance from the respective distance detection member to a reference marker, and wherein the leading automatic guided vehicle is configured to, in response to a request of lateral movement of the transporter, generate the kinematic information indicating the lateral movement based on the distance information. In this way, the movement mode of the transporter can be more flexible which further improves the adaptability.

In some embodiments, the kinematic information indicates speeds and/or moving directions of the plurality of automatic guided vehicles.

In a second aspect, a method of transporting an object is provided. The method comprises obtaining scheduling information indicating a predetermined path for at least one carrier carrying the object, the carrier comprising a plurality of coupling members coupled to respective carrier connecting members of a plurality of automatic guided vehicles, the plurality of automatic guided vehicles connected to each other in a wired or wireless manner; generating kinematic information for the plurality of automatic guided vehicles based on the obtained scheduling information; and providing the kinematic information to each of the plurality of automatic guided vehicles to cause each of the automatic guided vehicle to move along the predetermined path.

In some embodiments, generating the kinematic information comprises generating the kinematic information based at least on a radian of the predetermined path and a positional relationship between the plurality of coupling members relative to the predetermined path.

In some embodiments, generating the kinematic information comprises generating the kinematic information based on the safety information indicating whether an obstacle is within a predetermined range.

In some embodiments, obtaining the scheduling information comprises obtaining the scheduling information indicating the predetermined path and a destination for the object from a scheduling member.

In some embodiments, generating the kinematic information further comprises in response to a request of lateral movement of the transporter, generating the kinematic information indicating the lateral movement based on a distance information on a distance from a distance detection member to a reference marker.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent same components.

Throughout the drawings, the same or similar reference symbols are used to indicate the same or similar elements.

DETAILED DESCRIPTION

Figure 1:
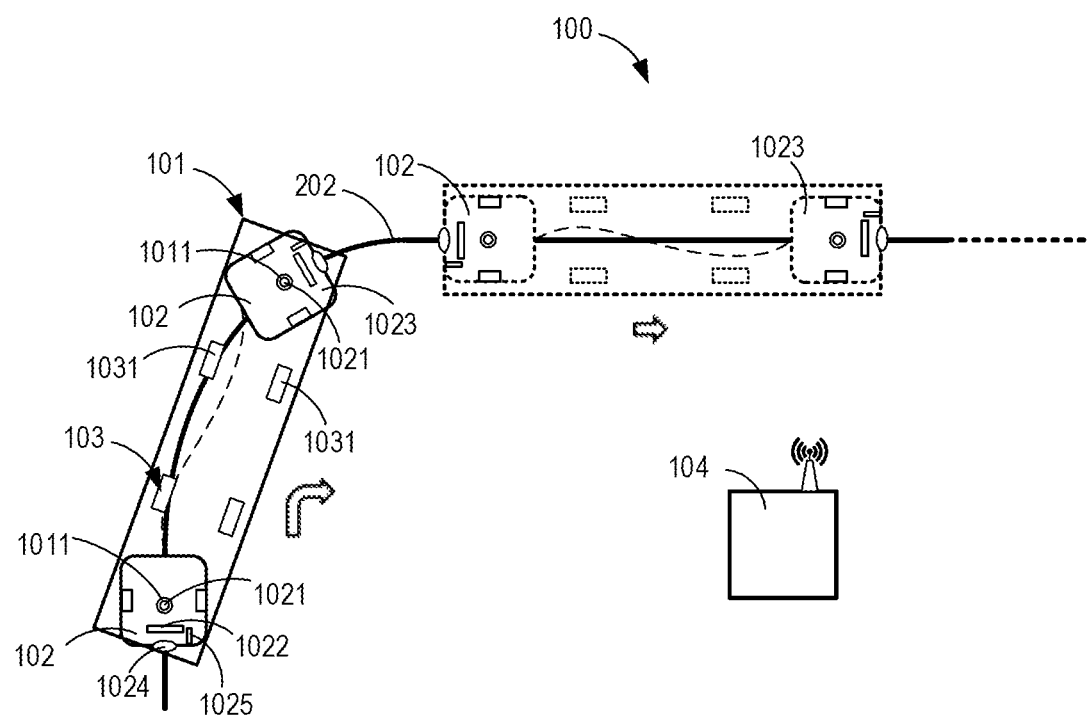
FIG. 1 shows a schematic diagram of a transporter moving from a position to another position along a predetermined path according to embodiments of the present disclosure.

The present disclosure will now be discussed with reference to several example embodiments. It is to be understood these embodiments are discussed only for the purpose of enabling those persons of ordinary skill in the art to better understand and thus implement the present disclosure, rather than suggesting any limitations on the scope of the subject matter.

As used herein, the term "comprises" and its variants are to be read as open terms that mean "comprises, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be comprised below. A definition of a term is consistent throughout the description unless the context clearly indicates otherwise.

One conventional solution to transport objects of large size with an automatic guided vehicle involves a towing-type transporter. The towing-type transporter uses an automatic guided vehicle and a trailer towed by the automatic guided vehicle at one end of the trailer. That is, another end of the trailer lacks support by the automatic guided vehicle to form a "null rear end". Due to this towing structures of the transporter, the vibration on the automatic guided vehicle will be amplified and applied on the carrier, resulting in a large vibration of the trailer, which impairs the transportation and quality of the transported objects.

Furthermore, the pivoting structure of the automatic guided vehicle at the front end of the carrier results in a larger rear area passed by the rear of the carrier than the front area passed by the front when turning. Furthermore, the front safety means aiming to monitor the front area cannot completely cover the rear area. Due to the lack of rear safety means for monitoring the rear area, there is a risk of harm to people or items within the rear area when the transporter turns.

Moreover, conventional solutions also include a type of transporter using a large automatic guided vehicle to transport objects of large sizes. By using the large automatic guided vehicle with a size slightly larger than or similar to the size of a carrier supported by the automatic guided vehicle, the objects of large sizes can be transported.

However, for this type of transporter, the automatic guided vehicle needs to be replaced with different objects to be transported. The poor adaptability of this type of transporter leads to high costs in a case where objects of various sizes need to be transported. Moreover, the large automatic guided vehicles with different sizes require a lot of parking or storage space, resulting in wasted space and inconvenience.

In order to at least partially address the above and other potential problems, embodiments of the present disclosure provide a transporter and a method of transporting an object.

Figure 2:
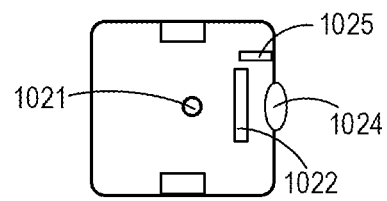
FIG. 2 shows top and side views of an automatic guided vehicle according to embodiments of the present disclosure.
Figure 2:
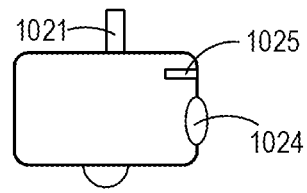
Figure 3:
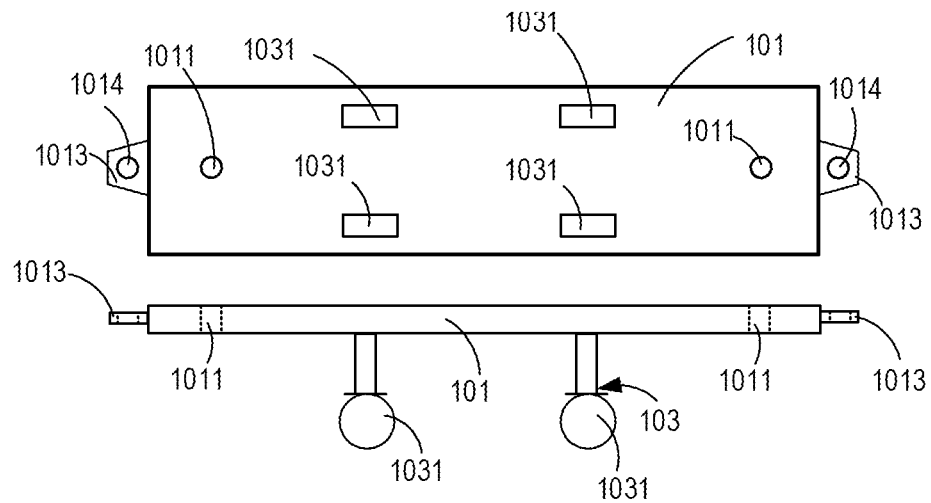
FIG. 3 shows top and side views of a carrier according to embodiments of the present disclosure.

FIG. 1 shows a schematic diagram of a transporter moving from a position to another position along a predetermined path; FIG. 2 shows top and side views of an automatic guided vehicle; and FIG. 3 shows top and side views of a carrier.

As shown, in general, the transporter 100 according to embodiments of the present disclosure comprise at least one carrier 101, a support assembly 103 for supporting the carrier 101 and a plurality of automatic guided vehicles 102.

The support assembly 103 in some embodiments may comprise carter wheels 1031 or universal wheels which enable the carrier 101 to transport the object along a predetermined path 202. The use of carter wheels 1031 or universal wheels improves steering freedom and flexibility of the carrier 101. It is to be understood that the above embodiments where the support assembly 103 comprises carter wheels 1031 or universal wheels are merely for illustrative purposes, without suggesting any limitation as to the scope of the present disclosure. Any other suitable support assembly 103 is also possible. For example, in some alternative embodiments, the support assembly 103 may also comprise track wheels or the like.

The carrier 101 is driven to move by the plurality of automatic guided vehicles 102. Each of the plurality of automatic guided vehicles 102 may be a standard automatic guided vehicle 102 with the same specifications and configuration. According to embodiments of the present application, with the standard automatic guided vehicle 102, objects of various sizes can be transported by the transporter 100. To this end, the only component that needs to be adjusted or replaced to adapt to different objects is the carrier 101, which is easily manufactured with relatively low costs. That is, the size and/or shape of the carrier 101 may be easily adjusted to meet the requirements of objects of different sizes and shapes, which will be discussed in detail below.

The carrier 101 comprises a plurality of coupling members 1011 to drive the automatic guided vehicle 102 to the carrier 101. The automatic guided vehicles 102 each comprise a carrier connecting member 1021 coupled to the respective coupling member 1011, as shown in FIGS. 2 and 3. By coupling the carrier connecting member 1021 to the respective coupling member 1011, the carrier 101 can be driven by the plurality of automatic guided vehicles 102.

In some embodiments, the carrier connecting member 1021 may comprise a pin that can be lifted or lowered manually or automatically. In addition, the coupling member 1011 may comprise an aperture for receiving the lifted pin. For example, to couple the automatic guided vehicles 102 to the carrier 101, each automatic guided vehicle 102 may be moved manually or automatically to a position where the pin is vertically aligned with the aperture of the carrier 101. Then the pin is lifted to insert into the aperture to achieve the coupling. In some embodiments, there is any suitable means such as an elastic member or the like arranged on the pin or in the aperture to reduce fit clearance there between.

With the above arrangements of the carrier connecting member 1021 and the coupling member 1011, the coupling of the carrier 101 and the automatic guided vehicle 102 is easier to achieve or control, thereby reducing control difficulty. In some embodiments, the coupling member 1011 may be arranged adjacent to ends of the carrier 101, as shown in FIGS. 1 and 3. In this way, the automatic guided vehicles 102 are coupled to positions of the carrier 101 adjacent to the ends. That is, there is always one automatic guided vehicle 102 coupled to an rear end of the carrier 101, thereby to reduce the vibration due to the "null rear end" and thus improve the stability of the transporter 100.

It is to be understood that the above embodiments where the carrier connecting member 1021 comprises the pin are discussed merely for illustrative purposes, without suggesting any limitation as to the scope of the present disclosure. Any other suitable arrangement or structure is also feasible. For example, in some alternative embodiments, the carrier connecting member 1021 and the coupling member 1011 may also employ magnetic arrangements which can be coupled to each other by magnetic force.

Figure 4:
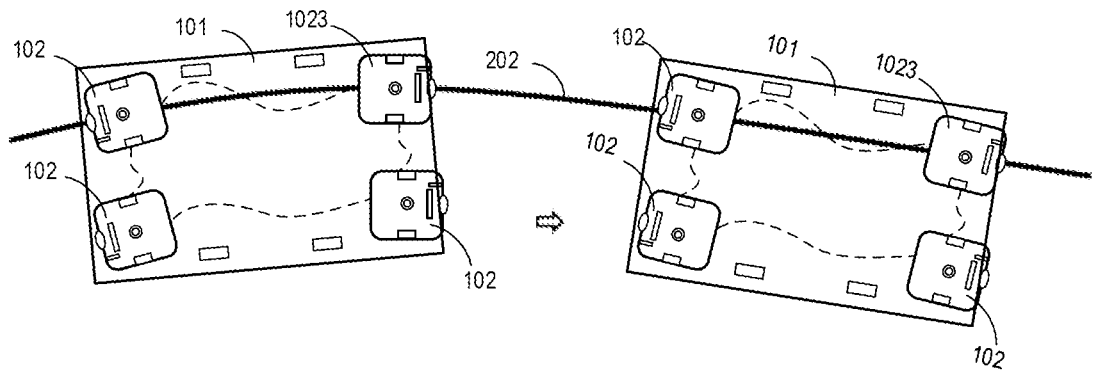
FIG. 4 shows a schematic diagram of a transporter according to embodiments of the present disclosure.

As mentioned above, the size and/or shape of the carrier 101 may be adjusted to meet the requirements of objects of different sizes and shapes. For example, in some embodiments, as shown in FIG. 4 which shows a schematic diagram of a transporter 100 with a large width carrier 101, the carrier 101 is driven by the plurality of automatic guided vehicles 102 arranged in two columns along a direction parallel to the determined path 202. With the arrangement, objects of large width can be well supported and transported by the transporter 100.

In some embodiments, the number of the automatic guided vehicles 102 arranged in one column may be different from or equal to that of the automatic guided vehicles 102 arranged in the other columns. For example, in the case where the carrier 101 is of a triangular shape, there may be two automatic guided vehicles 102 arranged in one column and one automatic guided vehicles 102 arranged in another column.

Furthermore, the distance between the automatic guided vehicles 102 arranged in each column may be different or the same. For example, in the case where the carrier 101 is of a trapezoidal shape, the distance of two automatic guided vehicles 102 arranged in the column adjacent to the long side of the trapezoidal shape may be larger than those arranged adjacent to the short side.

In addition, the angle between adjacent two columns may also be zero or non-zero. That is, the columns may be parallel to each other or form a non-zero angle. For example, in the case where the carrier 101 is of the trapezoidal shape as mentioned above, two columns of the automatic guided vehicles 102 may be arranged along bevel sides of the trapezoidal shape.

In short, among the plurality of automatic guided vehicles 102, there are two automatic guided vehicles 102 as a necessary unit. Other automatic guided vehicles 102 (if any) than the two automatic guided vehicles 102 may be arranged, as an option, at any suitable positions according to the size and/or shape of the carrier 101.

Alternatively, it is also possible to arrange the automatic guided vehicles 102 in more than two columns. For example, in some embodiments, for the carrier 101 with a broader width, three or four columns of the automatic guided vehicles 102 may also be employed. Furthermore, the number of the automatic guided vehicles in each column is not limited to 2 as shown in FIG. 4, and more than 2 automatic guided vehicles in each column are also possible.

The plurality of automatic guided vehicles 102 can move according to kinematic information provided by the leading one of the automatic guided vehicles 102, thereby driving the carrier 101 to move, which will be discussed in detail below. Furthermore, the shape of the carrier 101 is not limited to the rectangle as shown in FIGS. 3 and 4. In some embodiments, the carrier 101 may be of a triangular or trapezoidal shape or the like. In this event, the coupling positions of the automatic guided vehicles 102 may also be adjusted accordingly.

Figure 5:
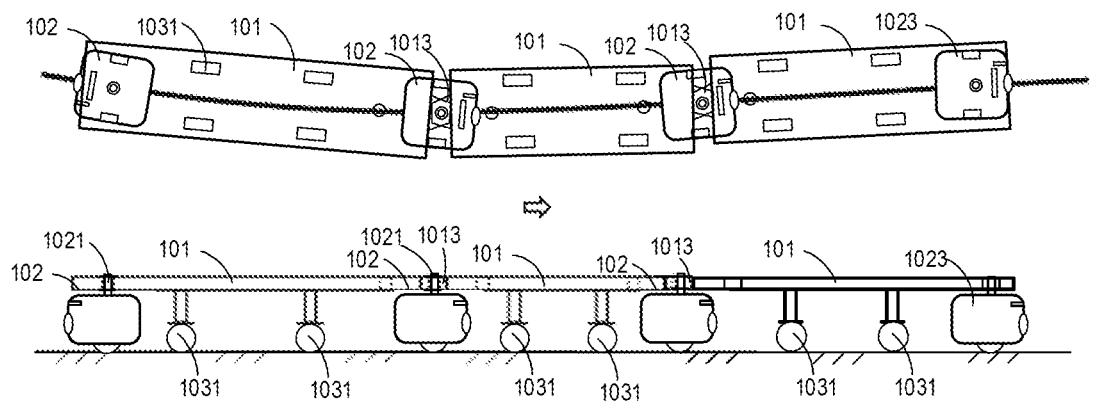
FIG. 5 shows top and side views of a transporter according to embodiments of the present disclosure.

In some embodiments, the at least one carrier 101 may comprise a plurality of carriers 101. FIG. 5 shows top and side views of a transporter with a plurality of carriers 101. The carriers 101 of different or same shapes and sizes can be connected or coupled to each other to transport objects of larger size or a more significant number. In this way, the transporter's capacity and applicability can be significantly improved without increasing costs.

As shown in FIGS. 3 and 5, in some embodiments, the plurality of carriers 101 may be connected in series via connecting members 1013 arranged between the plurality of carriers 101. For example, the connecting members 1013 may be arranged on one or both ends of the carrying tray 1012. The connecting members 1013 arranged on adjacent carriers 101 can be coupled to each other by suitable coupling means such as magnetic connections, bolt connections or snap connections.

In some embodiments, each connecting member 1013 may comprise a coupling portion 1014, as shown in FIGS. 3 and 5. The coupling portion 1014 may be coupled to the carrier connecting member 1021 of the respective automatic guided vehicle 102. In this way, the number of automatic guided vehicles 102 for driving the plurality of carriers 101 can be significantly reduced.

For example, if the carrier connecting member 1021 is coupled to the coupling member 1011 of the carrier 101, six automatic guided vehicles are needed for the three carriers 101. By contrast, if some carrier connecting members 1021 are coupled to the coupling portions 1014 of the connecting members 1013 as shown in FIG. 5, only N+1 automatic guided vehicles are needed for N carriers 101. As a result, the costs of the transporter 100 can be reduced.

The automatic guided vehicles 102 each comprise patrol assemblies 1022 which enable the automatic guided vehicles 102 to separately travel along the predetermined path 202 according to the kinematic information, which will be discussed further below. Example implementations of the patrol assembly 1022 include, but are not limited to, a guide tape assembly, a laser target navigation assembly, or a wired or slotted assembly.

The plurality of automatic guided vehicles 102 are communicatively connected to each other in a wired or wireless manner. For example, the plurality of automatic guided vehicles 102 may be coupled to exchange data/information through Bluetooth, Wi-Fi, near field communication (NFC) and/or any suitable communication protocols. This arrangement can be conducive to the transmission of data between the plurality of automatic guided vehicles 102, thereby to facilitate the control to the plurality of automatic guided vehicles 102.

In some embodiments, one of the automatic guided vehicles 102 functions as a leading automatic guided vehicle 1023 to obtain scheduling information. The scheduling information at least indicates the predetermined path 202 along which the automatic guided vehicles 102 shall move. Such scheduling information can be provided by a scheduling member 104 of the transporter 100. The scheduling member 104 in some embodiments may be a control system such as a fleet management system used in a factory to manage or schedule production processes. In this way, only data communication between the scheduling member 104 and the leading automatic guided vehicle 1023 is required to obtain the scheduling information. As a result, the complexity of control of the transporter 100 can be significantly reduced. The scheduling member 104 may be coupled to the automatic guided vehicles 102 in a wired or wireless manner.

Actually, due to the same specifications and configuration of the plurality of automatic guided vehicles, as mentioned above, any of the plurality of automatic guided vehicles 102 can be designated as a leading automatic guided vehicle to obtain the scheduling information. For example, in the case where the transporter is moved in a moving direction indicated by the arrows as shown in FIG. 1, the automatic guided vehicle at a leading position in the moving direction may be designated as the leading automatic guided vehicle 1023 to facilitate task execution.

Similarly, for the case as shown in FIG. 4, the automatic guided vehicle on the predetermined path and at the leading position in the moving direction may be designated as the leading automatic guided vehicle 1023. For the case as shown in FIG. 5, the leading automatic guided vehicle in the moving direction may be designated as the leading automatic guided vehicle 1023. In short, a designation principle for the leading automatic guided vehicle 1023 is conducive to the transportation of objects with high safety performance.

During the transportation of the object, in case of a failure of the designated leading automatic guided vehicle 1023, any other of the plurality of automatic guided vehicles 102 can be re-designated as a new leading automatic guided vehicle 1023 to achieve the role of the leading automatic guided vehicle 1023. The failure of the designated leading automatic guided vehicle 1023 may comprise any error or defect that may affect the achievement of its role as a leading automatic guided vehicle. In this way, the flexibility of control and the reliability of transportation can be further improved.

Figure 6:
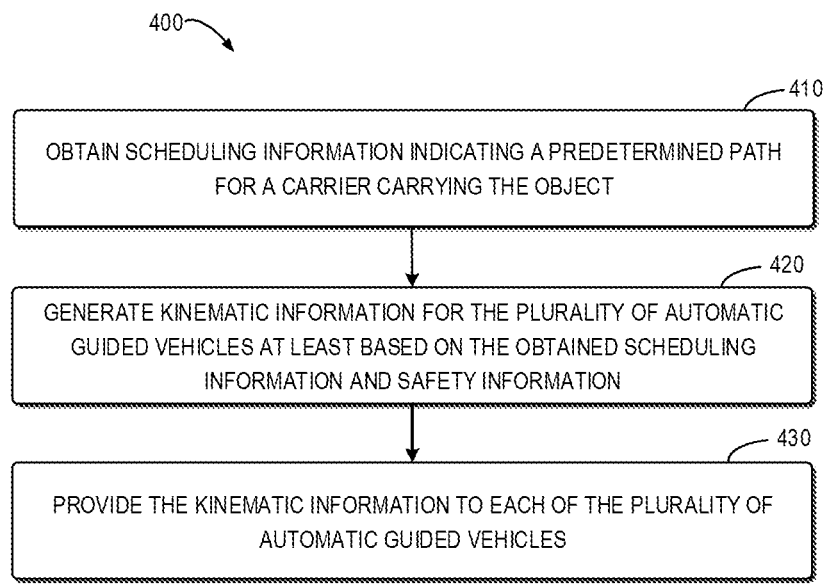
FIG. 6 shows a flowchart illustrating a method of transporting an object according to embodiments of the present disclosure.

As mentioned above, each automatic guided vehicle 102 can move according to respective kinematic information to transport objects. The kinematic information for each automatic guided vehicle 102 is provided by the leading automatic guided vehicle 1023. FIG. 6 shows a flowchart illustrating a method 400 of transporting an object with the transporter 100. The method can be implemented as program codes stored in a memory of each automatic guided vehicle 102, which can be performed by a processor of the automatic guided vehicle 102. At block 410, in response to being designated as the leading automatic guided vehicle 1023 by the scheduling member 104, for example, the processer of the leading automatic guided vehicle 1023 will obtain scheduling information at least on a predetermined path 202. In some embodiments, the leading automatic guided vehicle 1023 may also be designated. In some embodiments, besides the predetermined path 202, the scheduling information may also indicate other suitable information such as a destination of an object to be transported. Based on the scheduling information, at block 420, the leading automatic guided vehicle 1023 can generate kinematic information for the plurality of automatic guided vehicles 102.

At block 430, the generated kinematic information is then provided to the plurality of automatic guided vehicles 102. In some embodiments, the kinematic information may at least indicate speeds and/or moving directions of the plurality of automatic guided vehicles 102. Then the plurality of automatic guided vehicles 102 can be moved based on the kinematic information. During the transportation, the leading automatic guided vehicle 1023 may also obtain the status information from the plurality of automatic guided vehicles 102 and provide the status information to the scheduling member 104, for example.

The above processes will be described in detail below by using the embodiments as shown in FIG. 4 as an example. After obtaining the scheduling information, the leading automatic guided vehicle 1023 will generate the kinematic information for each automatic guided vehicle 102. Specifically, for the automatic guided vehicle (referred to as a rear automatic guided vehicle for case of discussion) directly behind the leading automatic guided vehicle 1023, which is on the predetermined path 202, the kinematic information for the rear automatic guided vehicle can merely comprise a speed value at which it travels.

In the case as shown in FIG. 4, the speed of the rear automatic guided vehicle is configured to be the same as that of the leading automatic guided vehicle 1023. In this way, the coordination of the movement between the leading and rear automatic guided vehicles is improved, thereby preventing the stress on the carrier 101 due to inconsistent speeds of the two automatic guided vehicles. The conditions described above for leading and rear automatic guided vehicles are also applicable to other cases of the automatic guided vehicles moving along the predetermined path, as shown in FIG. 5, for example.

The automatic guided vehicles as shown in FIG. 4 other than the leading and rear automatic guided vehicles, as shown, do not travel on the predetermined path 202. Nevertheless, those automatic guided vehicles not travelling on the predetermined path 202 can still move with leading automatic guided vehicle 1023 with high coordination because their kinematic information can be uniquely determined according to the predetermined path 202. For example, based at least on a radian of the predetermined path 202 and a positional relationship between the plurality of coupling members 1011 relative to the predetermined path 202, the kinematic information for them can be uniquely determined.

Specifically, the positional relationship between the plurality of coupling members 1011 may comprise a distance of the coupling members 1011 away from the predetermined path 202. With the radian of the predetermined path 202 and the positional relationship being determined, the proportional relationship between speeds of the leading automatic vehicle 1023 and the automatic guided vehicles 102 (referred to as bias automatic guided vehicles for ease of discussion) which are not on the predetermined path 202 can be determined. Furthermore, the moving directions of the bias automatic guided vehicles 102 can also be determined. By providing the kinematic information indicating the determined speeds and moving directions to the bias automatic guided vehicles 102, their movements can be controlled in high coordination with the leading automatic guided vehicle 1023.

Figure 7:
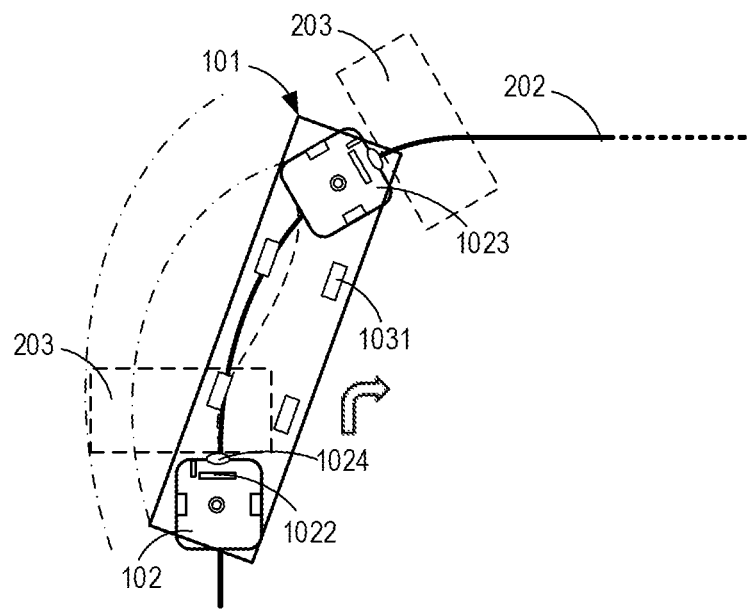
FIG. 7 shows a schematic diagram of a transporter with a monitoring member according to embodiments of the present disclosure.

To improve the safety performance of the transporter 100, in some embodiments, each automatic guided vehicle 102 may comprise a monitoring member 1024, as shown in FIGS. 2 and 7. The monitoring member 1024 may be arranged at a suitable portion of the automatic guided vehicle 102 facilitating the detection of an obstacle within a predetermined range 203. In some embodiments, the predetermined range may extend beyond the edges of the carrier 101 to further improve the safety.

The monitoring member 1024 can provide safe information indicating whether an obstacle is within the predetermined range 203. Then the leading automatic guided vehicle 1023 can provide the kinematic information to the plurality of automatic guided vehicles 102 further based on the safety information from all of the plurality of automatic guided vehicles 102. To this end, in some embodiments, the leading automatic guided vehicle 1023 may generate the kinematic information further based on the safety information indicating whether an obstacle is within a predetermined range 203. For example, if there are obstacles within the predetermined range 203 during transportation, which can be detected by the monitoring member 1024, the monitoring member 1024 then provides the safety information on the obstacles in the predetermined range 203 to the leading automatic guided vehicle 1023. Then the leading automatic guided vehicle 1023 provides the kinematic information on reducing the speeds of the automatic guided vehicle 102 to zero to improve the safety.

In some embodiments, the predetermined range 203 may be adjustable. For example, the adjusting of the predetermined range 203 can be achieved by adjusting an orientation of the respective automatic guided vehicle 102 according to the position of the automatic guided vehicle. As shown in FIG. 7, the rear automatic guided vehicle 102 may be controlled to face forward in the moving direction when the transporter turns. In this way, the monitoring member 1024 of the rear automatic guided vehicle 102 can detect obstacles within the rear area of the transporter 100 thereby improving the safety of the transporter 100.

Alternatively or additionally, in some embodiments, the predetermined range 203 may also be adjusted by adjusting parameters of the monitoring member 1024 associated with a shape and size of a detection range of the monitoring member 1024. That is, the predetermined range 203 can be enlarged, reduced, shifted or adjusted to change a shape of the predetermined range 203 to cover the required detection range and thus to facilitate the detection. In some embodiments, the predetermined range 203 may also be adjusted to ignore a certain range to avoid false detection.

In some embodiments, the destination of transported objects may require lateral movement of the transporter 100 to facilitate the manufacture of the objects, for example. In this event, when the transporter 100 needs to move to a position laterally aligned with the destination, a request of the lateral movement of the transporter 100 may be generated. In the meantime, a distance between the transporter 100 and the destination needs to be detected.

Figure 8:
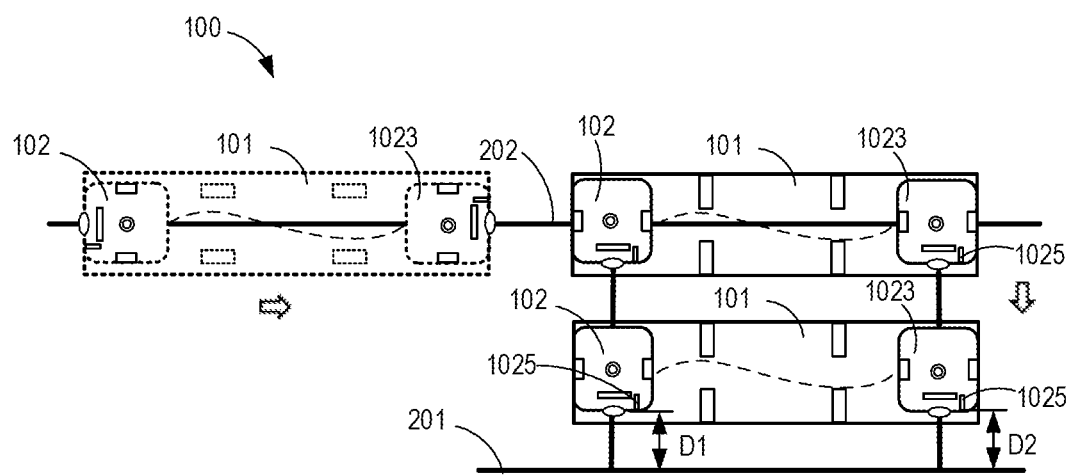
FIG. 8 shows a schematic diagram of a transporter laterally moving from a position to another position according to embodiments of the present disclosure.

To this end, in some embodiments, the plurality of automatic guided vehicles 102 may comprise at least two distance detection members 1025. For example, the at least two distance detection members 1025 may be respectively arranged on the at least two automatic guided vehicles 102 at a leading position in the lateral movement direction. In some embodiments, all the automatic guided vehicles 102 may each comprise a distance detection member 1025, as shown in FIGS. 2 and 8.

The distance detection member 1025 may be located at a suitable portion of the automatic guided vehicle 102. For example, as shown in FIG. 2, the distance detection member 1025 may be arranged at the same side of the automatic guided vehicle 102 as the monitoring member 1024. In response to the request of the lateral movement of the transporter 100, the automatic guided vehicles 102 at the leading position in the lateral movement direction may be re-oriented to cause the distance detection member 1025 towards the destination, as shown in FIG. 8.

In some embodiments, a reference marker 201 may be located adjacent to the destination as a reference for providing the distance information. Furthermore, the reference marker 201 may be any suitable structure. For example, the reference marker 201 may be a wall or an edge adjacent to the destination. In some alternative embodiments, the reference marker 201 may also be a virtual wall or a magnetic tape.

Each of the distance detection members 1025 of the automatic guided vehicles 102 at a leading position in the lateral movement direction can provide distance information on the obtained distance from the respective distance detection member 1025 to the reference marker 201. Then, in response to the request of lateral movements of the transporter 100, the leading automatic guided vehicle 1023 can generate and provide the kinematic information indicating the lateral movement based on the distance information. In this way, the transporter 100 can be moved to the destination accurately.

For example, as shown in FIG. 8, in some embodiments, the distance detection member 1025 of the leading automatic guided vehicle 1023 may provide distance information on the obtained distance D2. Similarly, the distance detection member 1025 of the other automatic guided vehicle 102 than the leading automatic guided vehicle 102 as shown in FIG. 8 may provide distance information on the obtained distance D1. By using different distance detection members 1025 on the automatic guided vehicles to detect different distances, the transporter 100 can be placed at any appropriate angle or position relative to the reference marker 201.

It can be seen from the above that by employing a carrier 101 with a suitable shape and size and a plurality of automatic guided vehicle 102, the adaptability of the transporter 100 can be significantly improved. Furthermore, the monitoring member 1024 of the automatic guided vehicle 102 can detect the rear area of the transporter 100, thereby improving the safety of the transporter 100.

It is to be understood that the order of the above steps does not mean that the method must be performed in that order, and the order in which these steps are performed can be adjusted or performed simultaneously.

It should be appreciated that the above detailed embodiments of the present disclosure are only to exemplify or explain principles of the present disclosure and not to limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A transporter comprising:
   at least one carrier comprising a plurality of coupling members;
   a support assembly adapted to support the at least one carrier and enable the at least one carrier to transport an object along a predetermined path; and
   a plurality of automatic guided vehicles connected to each other in a wired or wireless manner and configured to obtain kinematic information from one of the plurality of automatic guided vehicles designated as a leading automatic guided vehicle, wherein each of the plurality of automatic guided vehicles comprises:
      a carrier connecting member coupled to a respective coupling member of the plurality of coupling members to enable the at least one carrier to move with the plurality of automatic guided vehicles; and
      a patrol assembly adapted to enable a respective automatic guided vehicle of the plurality of automatic guided vehicles to move along the predetermined path;
   wherein the leading automatic guided vehicle configured to provide the kinematic information based at least on a radian of the predetermined path and a positional relationship between the plurality of coupling members relative to the predetermined path.

2. The transporter of claim 1, wherein any other of the plurality of automatic guided vehicles can be re-designated as the leading automatic guided vehicle during a transportation of the object in case of a failure of the previously designated leading automatic guided vehicle.

3. The transporter of claim 1, wherein the at least one carrier comprises:
   a plurality of carriers connected in series via connecting members arranged between the plurality of carriers.

4. The transporter of claim 3, wherein the connecting members each comprise a coupling portion adapted to be coupled to the carrier connecting member of the respective automatic guided vehicle.

5. The transporter of claim 1, wherein the plurality of automatic guided vehicles are arranged in at least two columns along a direction parallel to the predetermined path.

6. The transporter of claim 1, wherein the plurality of automatic guided vehicles each comprise a monitoring member configured to provide safety information indicating whether an obstacle is within a predetermined range, and wherein the leading automatic guided vehicle is configured to provide the kinematic information to the plurality of automatic guided vehicles further based on the safety information from the plurality of automatic guided vehicles.

7. The transporter of claim 6, wherein the predetermined range is adjustable.

8. The transporter of claim 1, further comprising:
   a scheduling member configured to provide scheduling information on the predetermined path and a destination for the object to the leading automatic guided vehicle.

9. The transporter of claim 8, wherein the plurality of automatic guided vehicles comprise at least two distance detection members each configured to provide distance information on a distance from the respective distance detection member to a reference marker, and
   wherein the leading automatic guided vehicle is configured to, in response to a request of lateral movement of the transporter, generate the kinematic information indicating the lateral movements based on the distance information.

10. The transporter of claim 1, wherein the kinematic information indicates speeds of the plurality of automatic guided vehicles, moving directions of the plurality of automatic guided vehicles, or both the speeds and the moving directions of the plurality of automatic guided vehicles.

11. A method of transporting an object, comprising:
   obtaining scheduling information indicating a predetermined path for at least one carrier carrying the object, the at least one carrier comprising a plurality of coupling members coupled to respective carrier connecting members of a plurality of automatic guided vehicles, the plurality of automatic guided vehicles connected to each other in a wired or wireless manner;
   generating kinematic information for the plurality of automatic guided vehicles based on the obtained scheduling information, wherein generating the kinematic information comprises:

generating the kinematic information based at least on a radian of the predetermined path and a positional relationship between the plurality of coupling members relative to the predetermined path; and providing the kinematic information to each of the plurality of automatic guided vehicles to cause each of the plurality of automatic guided vehicles to move along the predetermined path.

12. The method of claim 11, wherein generating the kinematic information comprises:

generating the kinematic information based on a safety information indicating whether an obstacle is within a predetermined range.

13. The method of claim 11, wherein obtaining the scheduling information comprises:

obtaining the scheduling information indicating the predetermined path and a destination for the object from a scheduling member.

14. The method of claim 11, wherein generating the kinematic information comprises:

in response to a request of lateral movement of the at least one carrier, generating the kinematic information indicating the lateral movements based on a distance information on a distance from a distance detection member to a reference marker.

* * * * *